United States Patent

Matsushita et al.

[15] 3,638,194

[45] Jan. 25, 1972

[54] FIXED MEMORY APPARATUS

[72] Inventors: Shigenori Matsushita; Tatsuo Ishikawa, both of Tokyo, Japan

[73] Assignee: Tokyo Shibaura Electric Company Limited, Kawasaki-shi, Japan

[22] Filed: Mar. 25, 1970

[21] Appl. No.: 22,433

[30] Foreign Application Priority Data

Dec. 16, 1969 Japan ....................44/100602
Dec. 28, 1969 Japan ....................44/105075

[52] U.S. Cl. ....................340/172.5
[51] Int. Cl. ....................G11c 5/02
[58] Field of Search ....................340/172.5

[56] References Cited

UNITED STATES PATENTS

| | | | |
|---|---|---|---|
| 3,248,708 | 4/1966 | Haynes | 340/172.5 |
| 3,273,129 | 9/1966 | Mullery et al. | 340/172.5 |
| 3,275,991 | 9/1966 | Schneberger | 340/172.5 |
| 3,238,510 | 3/1966 | Ergott, Jr. | 340/172.5 |
| 3,350,695 | 10/1967 | Kaufman et al. | 340/172.5 |
| 3,402,398 | 9/1968 | Koerner et al. | 340/172.5 |

*Primary Examiner*—Paul J. Henon
*Assistant Examiner*—Paul R. Woods
*Attorney*—Flynn & Frishauf

[57] ABSTRACT

A fixed memory apparatus comprising a first memory unit having a fixed configuration in which it is substantially impossible to alter the memory content, a second fixed memory unit in which the memory content is relatively easily altered and a logic control means for logically controlling the memory contents read out of both said fixed memory units.

15 Claims, 12 Drawing Figures

FIXED MEMORY APPARATUS

BACKGROUND OF THE INVENTION

This invention relates to fixed memory apparatus memorizing a microprogram of a computer.

A microprogram for a computer has extensive applications in keeping pace with the advancement of the high-speed computer processing technique. A fixed memory for use in the microprogramming includes a memory matrix consisting of word lines, sense lines and memory elements connected to predetermined intersections of these lines, where whether these elements are present or absent constitutes a memory content. Such memory content which is usually incapable of change or alteration, is sometimes desired to be altered or modified depending upon specific purposes of the fixed memory. The alteration of the memory content is usually done by changing the position of a memory element required to be changed. However, the alteration is very difficult when the fixed memory is miniaturized using integrated circuits, deposited resistors or other techniques. For the miniaturized fixed memory apparatus, the alteration of the memory content is accomplished by physically breaking or removing the required memory element, but it is impossible to easily add new memory elements to the memory content. The alteration by the breaking or removal of memory elements becomes possible for a very fine alteration, for instance one or two bits but impossible in case of the alteration of a word.

SUMMARY OF THE INVENTION

The object of the invention is to overcome the foregoing drawbacks by the provision of a novel fixed memory apparatus, which comprises in combination a first fixed memory unit that is a small size unit such as an IC or a deposited resistor matrix but in which it is extremely difficult to physically modify the memory content, and a second fixed memory unit that is a large size unit such as the usual diode matrix, but in which it is relatively easy to physically modify the memory content, and which thus enables physical modification of the memory content.

The invention can be fully understood from the following description with reference to the appended drawings, in which.

DETAILED DESCRIPTION OF THE PREFERRED EMBODIMENTS

Figure 1:
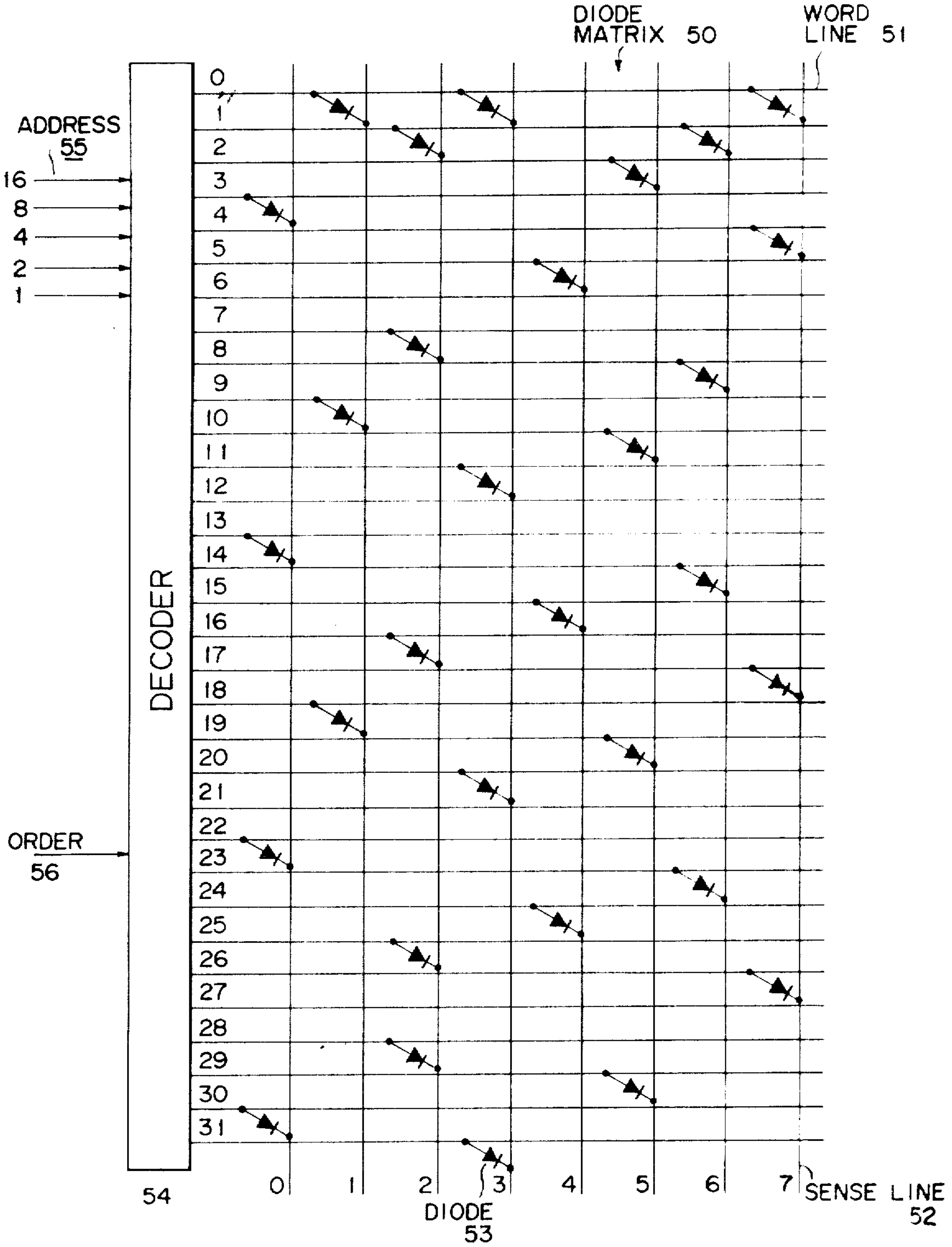
FIG. 1 shows a circuit construction of the ordinary fixed memory.

Prior to describing the invention, the construction and operation of the ordinary fixed memory is first described with reference to FIG. 1.

Reference numeral 50 generally designates a diode matrix consisting of 32 word lines constituting an array 51, eight sense lines in an array 52 perpendicular thereto and a plurality of diodes 53 inserted between the word and sense lines at predetermined ones of 32×8 intersections therebetween. The word lines in the array 51 are respectively designated 0 to 31.

Similarly, the sense lines in the array 52 are respectively designated 0 to 7. Reference numeral 54 designates a decoder having six input terminals, five of which, respectively indicated at 1, 2, 4, 8 and 16 corresponding to weights of respective address signals, constitute an array 55, and the remaining one of which receives signal through an order signal line 56. In operation, when the order signal is impressed, an output is produced across a word line specified by the address signals. For instance, when the 2-weighing address signal enters the decoder 54, an output is produced across the word line 2 of the array 51. Likewise, when the 1-weighing and 16-weighing address signals enter the decoder, an output is produced across the word line 17 of the array 51. The output at the array 51 passes through diodes at intersections to the associated sense lines in the array 52. For instance, the output at the word line 0 appears at sense lines 1, 3 and 7 of the array 52. Thus, the fixed memory of this construction operates with an address scheme consisting of 32 words, each word consisting of 8 bits. This fixed memory also includes drivers and sense amplifiers (not shown) similar to the usual memories.

Various embodiments of the fixed memory apparatus according to the invention will now be described with reference to the accompanying drawings, where like or similar parts having the same function are designated by the identical reference numerals. Throughout the specification, the "first fixed memory unit" refers to a memory unit having a memory configuration in which is difficult or substantially impossible to physically alter the memory contents, and the "second fixed memory unit" refers to a memory unit in which physical alteration of the memory content is relatively simple. The term "difficult or substantially impossible to physically alter" means that the removal and addition of memory elements off and to the matrix are difficult due to the IC construction of miniaturized deposited resistor matrix construction of the fixed memory unit. The term "capable of relatively simple or easy physical alteration" means that the process of externally altering the memory content is simple by virtue of the ordinary memory elements such as diodes, used in the construction of the matrix.

Figure 2:
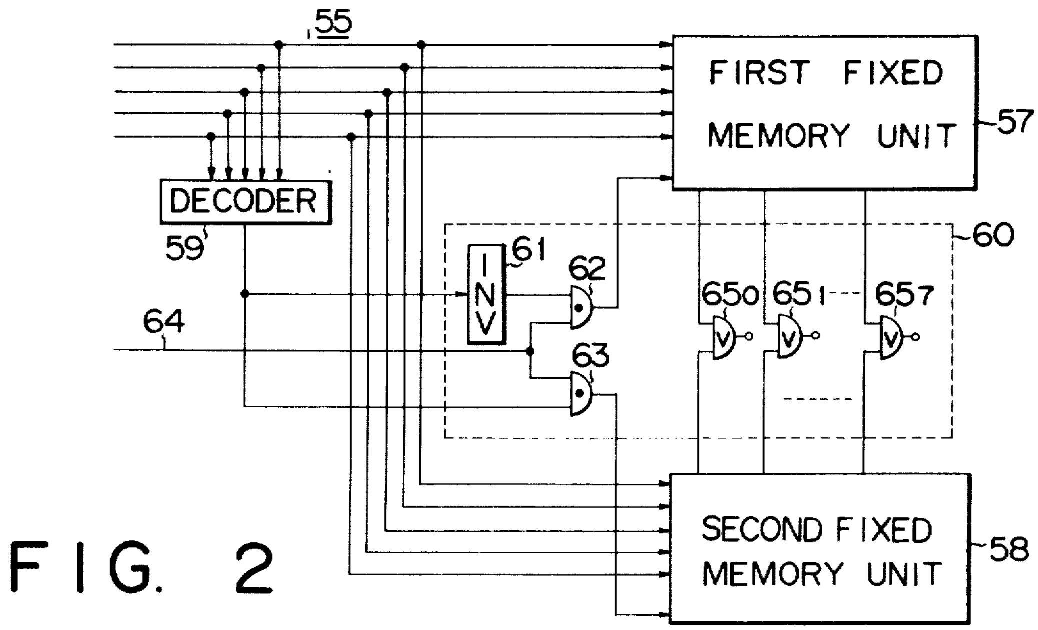
FIG. 2 is a block diagram of an embodiment of the fixed memory apparatus including a decoder and a logic circuit according to the invention.

An embodiment of the fixed memory apparatus shown in FIG. 2 comprises a first fixed memory unit 57, a second fixed memory unit 58, a decoder 59 and a logic circuit 60. The decoder 59 is constructed by connecting in parallel predetermined outputs of an ordinary decoder and produces a single output for each particular address signal which indicates a memory content which is required to be altered. The decoder 59 and the logic circuit 60 constitute a logic control means to logically control the outputs of the first and second fixed memory units 57 and 58. The logic circuit 60 includes an inverter 61, a first AND-gate 62, a second AND-gate 63 and a plurality of OR-gates $65_0, 65_1, \ldots, 65_7$ individually connected to respective output terminals of the first and second memory units 57 and 58. The input terminal of the inverter 61 and the first input terminal of the second AND-gate 63 are connected to the output terminal of the decoder 59. The first AND-gate 62 has the first input terminal connected to the output terminal of the inverter 61 and the second input terminal connected together with the second input terminal of the second AND-gate 63 to the order signal line 64. The output terminals of the first and second AND-gates 62 and 63 are respectively connected to the first and second fixed memory units 57 and 58.

In operation, when an address signal is given through the address signal line array 55 to the above-mentioned fixed memory apparatus, the decoder 59 provides an output if the address signal is a specific address signal. The decoder output is fed both to the inverter 61, where it is inverted to be fed to the first AND-gate 62, and to the second AND-gate 63. Thus, the order signal through the order signal line 64 is not given to the first fixed memory unit 57 but is given to the second fixed memory unit 58, and an output corresponding to a changed memory content of the second fixed memory unit 58 is obtained through the OR-gates $65_0, 65_1, \ldots, 65_7$.

The combination of the inverter 61 with the first and second AND-gates 62 and 63 constitutes an order signal control means which controls an order signal to be transmitted to the fixed memory units, in response to the output of the decoder 59. This means may be constituted by connecting the output terminal of the decoder through the inverter 61 to both the first AND-gate 62 and a separate inverter and further connecting the output terminal of the separate inverter to the second AND-gate 63.

The foregoing construction and operation is concerned with a memory apparatus having a modifiable memory content. The modification of the memory content may be achieved by changing positions of the required memory elements in the memory matrix of the second fixed memory unit 58. The memory matrix of the second unit 58 has memory elements which are capable of being easily externally attached and removed such as diodes, and may consist of only the word lines for the word that are required to be modified to modify the fixed memory content of the first fixed memory unit 57. Thus, it enables the construction of a fixed memory apparatus of a reduced size and in which the memory content is easily and readily altered.

The above altering process is possible for the following various other embodiments of the fixed memory apparatus.

Figure 3:
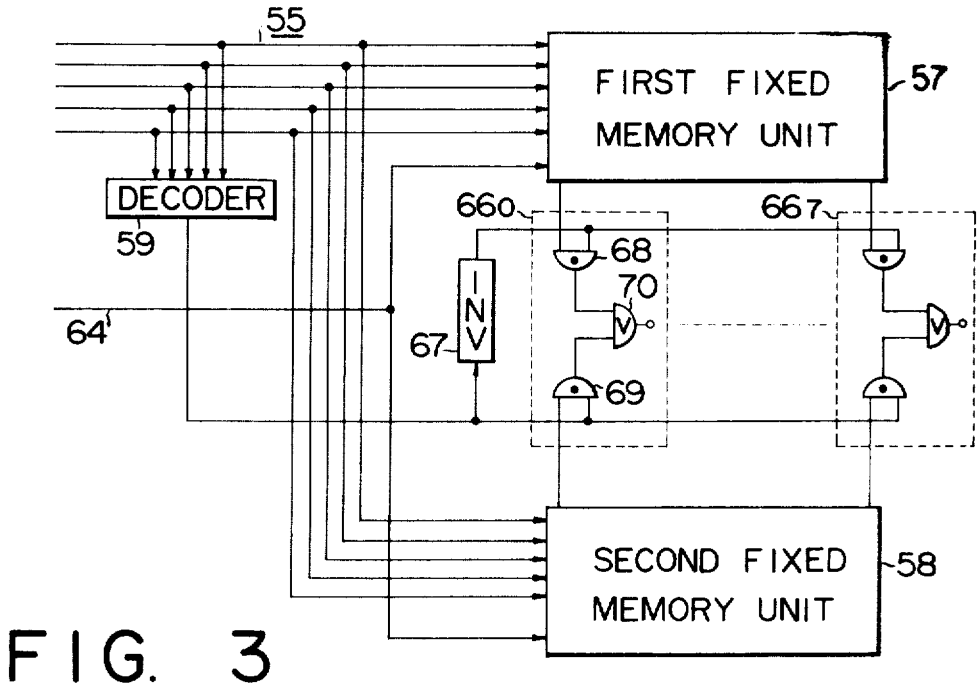
FIG. 3 is a block diagram of the fixed memory including a detector and a different logic circuit embodying the invention.

FIG. 3 shows another embodiment of the fixed memory apparatus having a decoder 59 and a logic circuit, which comprises a plurality of logic blocks $66_0$, $66_1$, . . . , $66_7$ and an inverter 67 connected in parallel with these logic blocks. Each logic block is inserted between the associated ones of the output terminals of the first and second fixed memory units 57 and 58, and includes the first and second AND-gates 68 and 69 and an OR-gate 70. The first and second AND-gates 68 and 69 have first input terminals respectively connected to the output of the first and second fixed memory units 57 and 58, second input terminals respectively connected to leads common to the second input terminals of the first and second AND gates of all the logic blocks, and output terminals respectively connected to two input terminals of the OR-gate 70. The opposite terminals of the inverter 67 are respectively connected to the second input terminals of the first and second AND-gates 68 and 69.

In operation, when an address signal is supplied through the address signal line array 55 to the fixed memory apparatus of FIG. 3, it is simultaneously impressed on both the first and second fixed memory units 57 and 58 and on the decoder 59, and the memory contents of the first and second fixed memory units are simultaneously read out. If the address signal is a specific one causing an output from the decoder 59, the memory content of the second fixed memory unit 58 is available through the gates 70. In other words, upon appearance of a particular address signal dictating a change of the memory content, the output of the decoder 59 is impressed upon the second AND gates of the logic blocks $66_0$, $66_1$, . . . , $66_7$ and the output of the second fixed memory 58 is obtained through the OR-gates 70. On the other hand, the output of the decoder 59 is inverted by the inverter 67 before impression upon the first AND-gates 68, so that there is no output from the first fixed memory unit 57.

Through the output terminal of the decoder 59 is connected to the second AND-gates 69, it may be connected to the first AND-gates 68 through the inverter 67. In essence, the logic circuit may be regarded to be a means to provide a signal of the inverse level to the decoder output to the first AND-gates 68, memory unit, and a signal of the same level as the decoder output to the second AND-gates 69.

Figure 4:
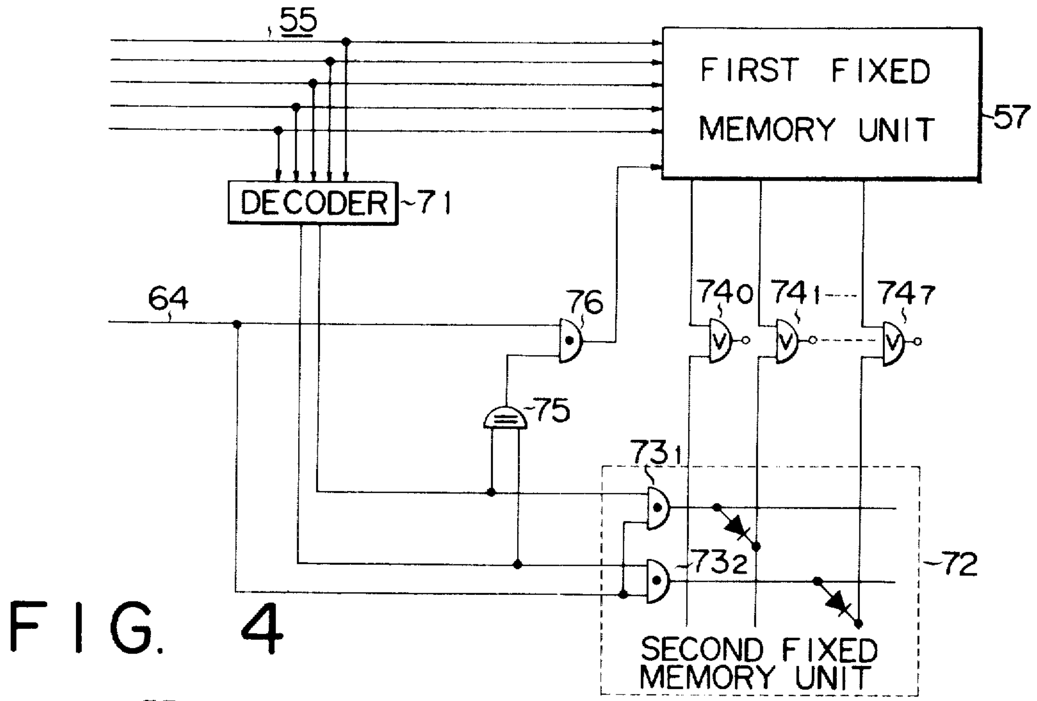
FIGS. 4 and 5 are block diagrams of further embodiments of the fixed memory apparatus according to the invention, each of which comprises a decoder and a logic circuit, and in which a decoder for the second fixed memory block is eliminated.

The fixed memory apparatus shown in FIG. 4 is an example of saving a decoder within the second fixed memory unit. It includes a decoder 71 having a plurality of output terminals, to each of which is supplied an output for respective particular signals. The second fixed memory unit 72 has a plurality of AND-gates $73_1$ and $73_2$ connected to the input ends of the respective word lines. Each of these AND gates has first and second input terminals respectively connected to a corresponding output terminal of the decoder 71 and to the order signal line 64 to receive the order signal. Between the first and second memory units 57 and 72 are connected a plurality of OR-gates $74_0$, $74_1$, . . . , $74_7$. To the output terminals of the decoder 71 are connected respective input terminals of a NOR-gate 75 having its output terminal connected to the first input terminal of an AND-gate 76 which has its second input terminal connected to the order signal line to receive the order signal.

In operation, when an address signal is given, the memory content of either the first or the second fixed memory unit is read out depending upon the kind of the address signal. Thus, if the address signal is a specific one, the decoder 71 provides an output to be fed together with the order signal to the AND-gate $73_1$ or $73_2$ of the second fixed memory unit 72, so that the memory content of the second fixed memory unit 72 is read out. On the other hand, the order signal is prevented from entering the first fixed memory unit 57 through the AND-gate 76 by the action of the NOR-gate 75.

The NOR-gate 75 and the AND-gate 76 constitute a means for blocking the order signal to the first fixed memory unit in accordance with the decoder output, which may thus be replaced by a circuit suitable to provide the desired result.

Figure 5:
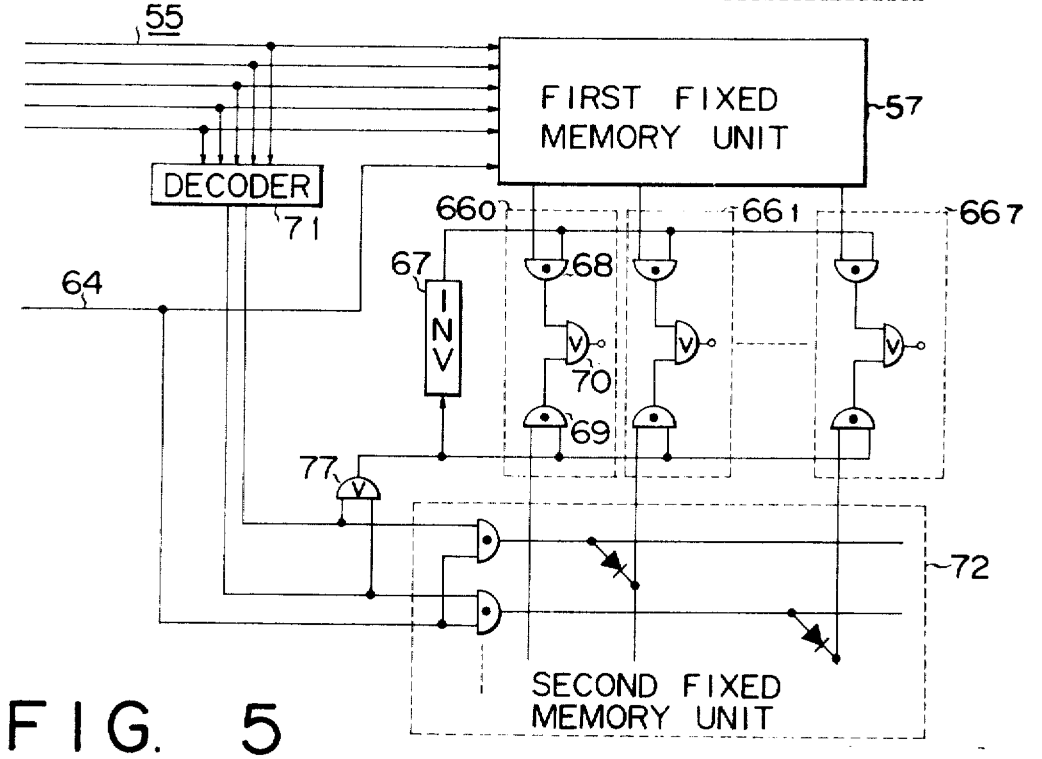

In a further embodiment of the fixed memory apparatus shown in FIG. 5, the systems in the embodiments of FIGS. 3 and 4 are combined together to selectively obtain the memory content on the output side of the fixed memory units.

In operation, when a specific address signal is supplied through the address signal line array 55 to the first fixed memory unit 57 and to the decoder 71, the decoder provides the output to be fed together with the order signal to the AND-gates of the second fixed memory unit 72, thereby causing the memory content of the second fixed memory unit 72 to be read out. The memory content is simultaneously read out of the first fixed memory unit 57. The output of the decoder 71 also enters an OR-gate 77, whose output is fed to the second AND-gates 69 and through the inverter 67 to the first AND-gates 68. Thus the output of the first fixed memory unit 57 does not appear at the first AND-gates 68, but the output of the second fixed memory unit 72 is available through the second AND-gates 69 and the OR-gates 70.

The output of the OR-gate 77 may be fed through a separate inverter to the first AND-gates 68. Such circuit construction may be regarded as means to provide a signal, which is inverse to the decoder output, to the first AND gates and a signal of the same level as the decoder output to the second AND gates.

Figure 6:
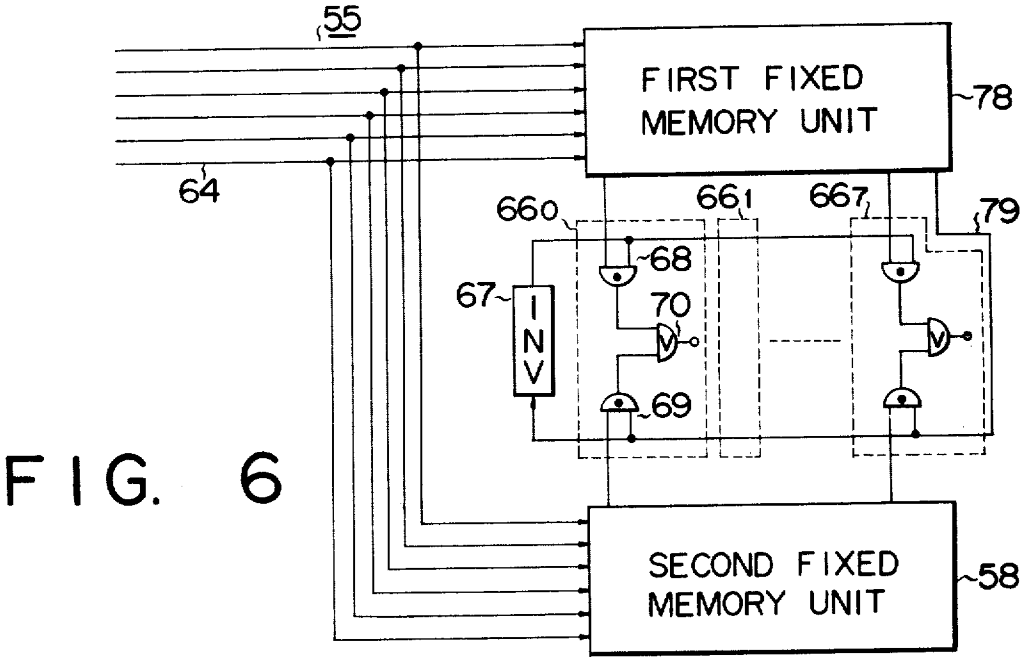
FIG. 6 is a block diagram of a still further embodiment of the fixed memory apparatus according to the invention, in which the first fixed memory block has a revision output line.

In a still further embodiment of the fixed memory apparatus shown in FIG. 6, the decoder 59 in the apparatus of FIG. 3 is omitted. In this embodiment, the first fixed memory unit 78 is substantially the same in circuit construction as the corresponding unit of FIG. 1, except for a revision output line 79 provided in parallel with the sense lines. An output for a word which requires a change of the memory content of the first fixed memory unit 78 is available through the revision output line 79. To state in more detail, the revision output line 79 is first incorporated into the memory matrix, which is a resistor matrix capable of subsequent connection of resistive elements at predetermined matrix intersections, without connecting the resistive element at any one of the intersections between it and all the word lines of the array 51. In case word revision for any word is required, the resistive element may be connected at an intersection between the revision output line 79 and the corresponding word line, so that when the revised word is read out the corresponding output appears at the revision output line 79. Alternatively, at all the intersections of the revision output line may be connected memory elements such as diodes and resistive elements. In such a construction, a required element at an intersection of the revision output line corresponding to a word to be revised is removed, so that absence of output at the revision output line 79 represents the revision of the memory content. The revision output line 79 is connected to the second input terminal of each of the second AND-gates 69 in the logic blocks $66_0$, $66_1$, . . . , $66_7$.

In operation, the memory contents of the first and second fixed memory units 78 and 58 are simultaneously read out by the same address signal, and usually the output of the first fixed memory unit 78 is available through the OR-gates 70. When a specific address signal through the address signal line array 55 enters, the revision output line 79 provides an output, which is fed to the second AND-gates 69 and at the same time through the inverter 67 to the first AND-gates 68, thereby causing the output from the first fixed memory unit 78 to be blocked at the first AND-gates 68 to cause the output of the second fixed memory unit 58 to appear at the output terminals of the OR-gates 70 through the second AND-gates 69. In consequence, the memory content relevant to the specific address signal may be read out as the memory content of the second fixed memory unit 58 independently of the memory content of the first memory unit 78.

Figure 7:
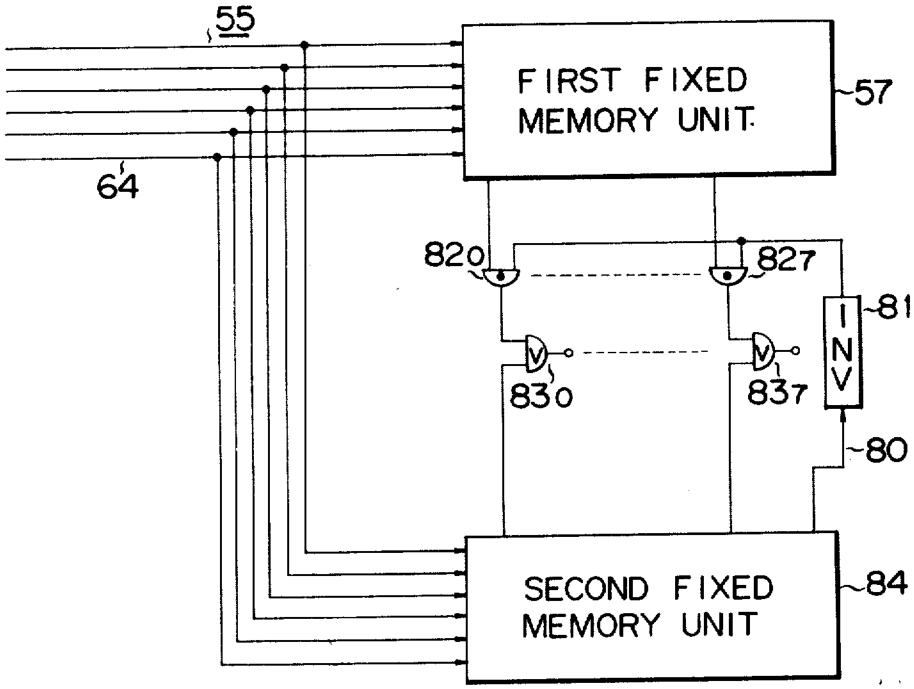
FIG. 7 is a block diagram of another embodiment of the fixed memory apparatus having a revision line.

FIG. 7 shows another embodiment of the fixed memory apparatus, wherein the revision output line of FIG. 6 is provided in the second fixed memory unit.

In this construction, the revision output line 80 is connected through the inverter 81 to the second input terminals of a plurality of AND-gates $82_0$, $82_1$, . . . , $82_7$, which have respective output terminals connected to the first input terminals of the corresponding OR-gates $83_0$, $83_1$, . . . , $83_7$, which in turn have the second input terminals directly connected to the output terminals of the second fixed memory unit 84.

In operation, when the usual address signal is applied to the memory apparatus, there is no revision signal at the revision output line 80, and the first fixed memory unit 57 provides output. When a specific address signal is received, the memory content of the second memory unit is read out, and at the same time the revision signal appears at the revision output line 80 to be inverted by the inverter 81 and subsequently fed to the AND-gates $82_0$, $82_1$, . . . , $82_7$ so as to block the output from the first fixed memory unit 57.

FIGS. 8 to 12 illustrate other embodiments of the fixed memory apparatus according to the invention for acquiring desired microprograms by combining the outputs of the first and second fixed memory units by means of a logic circuit.

Figure 8:
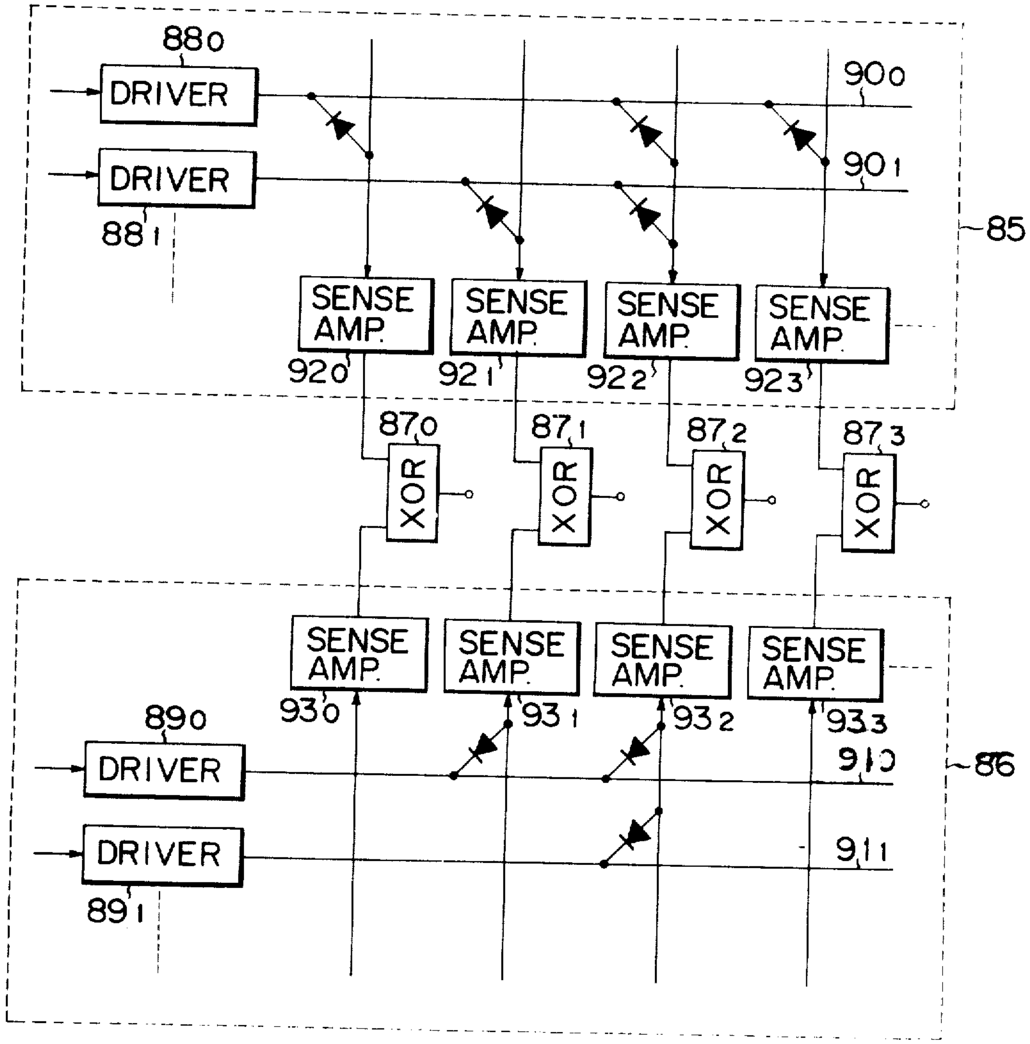
FIGS. 8 to 12 are block diagrams of five other embodiments having a logic circuit for logically coupling together the outputs of the first and second fixed memory units.

FIG. 8 shows part of the circuits of the first and second fixed memory units 85 and 86 and a logic control. The logic control is a logic circuit to logically combine the outputs of the memory units 85 and 86, and consists of a plurality of OR-gates $87_0$, $87_1$, . . . .

In operation, when an address signal is supplied to the first and second fixed memory units 85 and 86, outputs appear at the output terminals of drivers $88_0$ and $89_0$. The respective outputs are fed through diodes connected to word lines $90_0$ and $91_0$ to sense amplifiers $92_0$ and $92_2$ of the first fixed memory unit 85 and to sense amplifiers $93_1$ and $93_2$ of the second fixed memory unit 86. This means that information "1011" and information "0110" are respectively obtained from the first and second fixed memory units 85 and 86. These information signals are added to the logic circuit consisting of a plurality of exclusive OR-gates $87_0$, $87_1$, $87_2$ and $87_3$, so that information "1101" is ultimately obtained. Similarly, outputs appearing at the output terminals of drivers $88_1$ and $89_1$ are respectively added through diodes connected to word lines $90_1$ and $91_1$ to sense amplifiers $92_1$, $92_2$ and $93_2$ to produce information "0010" from the first fixed memory unit 85 and information "0010" from the second fixed memory unit 86 so as to ultimately provide information "0100" from the logic circuit.

If modification of the memory content of the first fixed memory unit 85 is desired, the memory matrix of the second fixed memory unit 86 is modified only for the required portions, whereby the outputs of the units 85 and 86 are combined logically. Thus, the alteration of the memory content may be accomplished by merely revising a few diodes in the second fixed memory unit 86.

Figure 9:
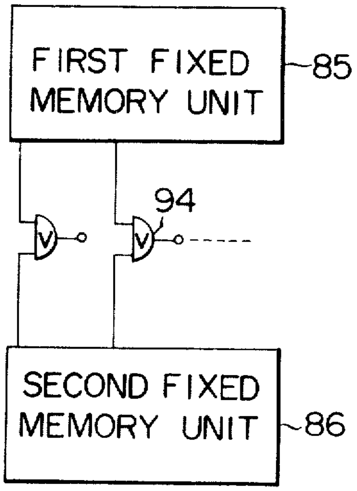

The memory apparatus shown in FIG. 9 makes use of OR-gates 94 for the logic circuit of FIG. 8. This construction is intended for the case of adding 1 as a particular bit of a word memorized by the first fixed memory unit, and only the bits that are required to be revised are set up in the second fixed memory unit.

Figure 10:
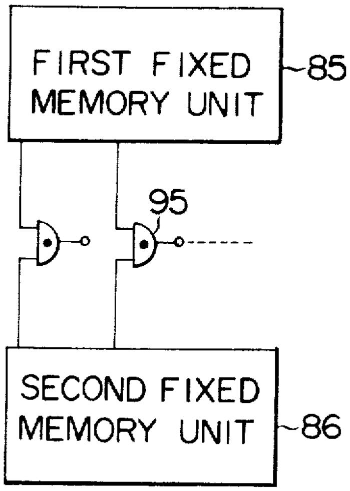

The memory apparatus shown in FIG. 10 uses AND-gates 95 for the logic circuit of FIG. 8. In this system, a method of inhibiting particular bits is employed.

Figure 11:
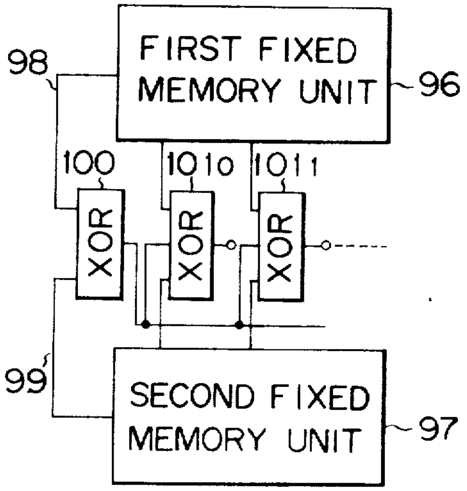

The memory apparatus shown in FIG. 11 includes the first and second fixed memory units 96 and 97 having respective inversion lines 98, 99, whose output ends are connected to the respective input terminals of the first exclusive OR-gate 100 which has its output terminal connected to the input terminal of a plurality of the second exclusive OR-gates $101_0$, $101_1$, logically combining the outputs of the first and second fixed memory units 96 and 97. If the output signals at the inversion lines 98 and 99 are "1," the output resulting from the inversion of all the bits of the memory content is regarded as true, while if the output signals at the inversion lines are "0," it is regarded as true information in itself.

Figure 12:
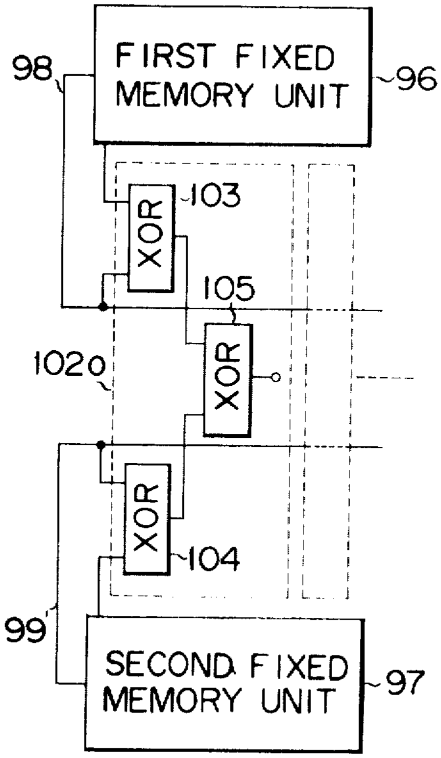

The memory apparatus shown in FIG. 12 has a logic circuit, which is a modification of the logic circuit of FIG. 11. The logic circuit consists of a plurality of logic blocks 102 each including first, second and third exclusive OR-gates 103, 104 and 105. The first exclusive OR-gate 103 has two input terminals respectively connected to the output terminal of the first fixed memory unit 96 and to the inversion line 98 and an output terminal connected to one of the two input terminals of the third exclusive OR-gate 105, which has its other input terminal connected to the second exclusive OR-gate 104, which in turn has two input terminals respectively connected to the output terminal of the second fixed memory unit 97 and to the inversion line 99.

In the foregoing embodiments diode matrices are used, which may be replaced by other types of matrices utilizing physical phenomena such as a capacitance or inductance coupled system, a photoelectric system, etc.

As has been described in the foregoing, according to the invention it is possible to provide a fixed memory apparatus of reduced size and wherein the memory content is easily altered.

What we claim is:

1. A fixed memory apparatus comprising:
   - a first fixed memory unit having a plurality of output terminals and wherein physical alteration of the memory content thereof is substantially impossible,
   - a second fixed memory unit having a plurality of output terminals and wherein physical alteration of the memory content is possible, and
   - a logic control means coupled to said first and second fixed memory units for logically controlling the memory contents read out of both of said fixed memory units.

2. The fixed memory apparatus according to claim 1 wherein said logic control means comprises a decoder to provide an output signal in response to a specific address signal, and a logic circuit to read out only the memory content of said second fixed memory unit responsive to the decoder output.

3. The fixed memory apparatus according to claim 2 wherein said logic circuit further comprises an order signal control means to couple an order signal to said second fixed memory unit in response to said decoder output, and a plurality of OR gates coupled between the output terminals of said first and second fixed memory units.

4. The fixed memory apparatus according to claim 2 wherein respective outputs of said memory units are associated with each other and said logic control means further comprises:
   - a plurality of logic elements each coupled between respective associated output terminals of said first and second fixed memory units, each logic element including a first AND gate having a first input terminal connected to a given respective output terminal of said first fixed memory unit, a second AND gate having a first input terminal connected to an output terminal of said second fixed memory unit which is associated with said given respective output terminal of said first fixed memory unit, and an OR gate having first and second input terminals respectively connected to the output terminals of said first and second AND gates; and means for coupling an output signal having a level inverse to said decoder output to said first AND gates, and for coupling an output of the same level as said decoder output to said second AND gates.

5. The fixed memory apparatus according to claim 2 wherein respective outputs of said memory units are associated with each other, said decoder has a plurality of output terminals, said second fixed memory unit comprises a matrix including a plurality of word lines, a plurality of sense lines which are coupled to the output terminals of said second fixed memory unit and a plurality of memory elements coupled to said word and sense lines, and a plurality of AND gates each having an output terminal connected to a respective word line, a first input terminal connected to respective output terminals of said decoder, and a second input terminal connected to an order line; and said logic circuit comprises means for preventing an order signal from entering said first fixed memory unit responsive to said decoder output, and a plurality of OR gates connected between respective associated output terminals of said first and second fixed memory units.

6. The fixed memory apparatus according to claim 2 wherein respective outputs of said memory units are associated with each other, and said second fixed memory unit comprises a matrix including a plurality of word lines, a plurality of sense lines which are coupled to the output terminals of said second fixed memory unit and a plurality of memory elements, coupled to said word and sense lines, and a plurality of first AND gates each having an output terminal connected to a respective word line, a first input terminal and a second input terminal connected to an order line, said decoder has a plurality of output terminals connected to the respective first input terminals of said first AND gates, and said logic circuit comprises a plurality of logic elements each connected between respective associated output terminals of said first and second fixed memory units, each logic element including a second AND gate having a first input terminal connected to a given respective output terminal of said first fixed memory unit, a third AND gate having a first input terminal connected to an output terminal of said second fixed memory unit which is associated with said given respective output terminal of said first fixed memory unit, and an OR gate having first and second input terminals respectively connected to the output terminals of said second and third AND gates and means for coupling an output signal having a level inverse to said decoder output to second AND gates, and for coupling an output of the same level as said decoder output to said third AND gates.

7. The fixed memory apparatus according to claim 1 wherein said first memory unit further includes a revision output line, and said logic control means comprises a logic circuit coupled to said revision line to logically select between the memory contents read out of said first and second fixed memory units in correspondence to the output at said revision output line.

8. The fixed memory apparatus according to claim 7 wherein said logic circuit comprises a plurality of logic elements each connected between the respective associated output terminals of said first and second fixed memory units, each logic element including a first AND gate having a first input terminal connected to a given respective output terminal of said first fixed memory unit, a second AND gate having a first input terminal connected to an output terminal of said second fixed memory unit which is associated with said given respective output terminal of said first fixed memory unit, and an OR gate having first and second input terminals respectively connected to the output terminals of said first and second AND gates an an inverter having an output terminal connected to the second input terminals of said first AND gates and an output terminal connected to the second input terminals of said second AND gates and to said revision output line.

9. The fixed memory apparatus according to claim 7 wherein said logic circuit comprises an inverter having an input terminal connected to said revision output line, a plurality of AND gates each having a first input terminal connected to a respective output terminal of said first fixed memory unit and a second input terminal connected to an output terminal of said inverter, and a plurality of OR gates each having a first input terminal connected to an output terminal of a corresponding one of said AND gates and a second input terminal connected to respective associated output terminals of said second fixed memory unit.

10. The fixed memory apparatus according to claim 1 wherein said logic control means comprises a logic circuit to logically combine outputs read out of said first and second fixed memory units.

11. The fixed memory apparatus according to claim 10 wherein respective outputs of said memory units are associated with each other said logic circuit comprises of a plurality of exclusive OR gates each connected between respective associated output terminals of said first and second fixed memory units.

12. The fixed memory apparatus according to claim 10 wherein said logic circuit comprises a plurality of OR gates each connected between the associated output terminals of said first and second fixed memory units.

13. The fixed memory apparatus according to claim 10 wherein said logic circuit comprises a plurality of AND gates each connected between respective associated output terminals of said first and second fixed memory units.

14. The fixed memory apparatus according to claim 10 wherein said first and second fixed memory units include respective inversion output lines, respective outputs of said memory units are associated with each other, and said logic circuit comprises a first exclusive OR gate having two input terminals connected respectively to the inversion output lines, and a plurality of second exclusive OR gates each having first and second input terminals respectively connected to associated output terminals of said first and second fixed memory units and a third input terminal connected to the output terminal of said first exclusive OR gate.

15. The fixed memory apparatus according to claim 10 wherein said first and second fixed memory units include respective inversion output lines, respective outputs of said memory units are associated with each other, and said logic circuit comprises a plurality of logic elements each connected between respective associated output terminals of said first and second fixed memory units, each logic element including a first exclusive OR gate having a first input terminal connected to an output of said first fixed memory unit and a second input terminal connected to the inversion output line of said first fixed memory unit, a second exclusive OR gate having a first input terminal connected to an associated output of said second fixed memory unit and a second input terminal connected to the inversion output line of said second fixed memory unit and a third exclusive OR gate having two input terminals connected respectively to the output terminals of said first and second exclusive OR gates.

* * * * *